(12) United States Patent
Norair

(10) Patent No.: US 9,154,392 B2
(45) Date of Patent: Oct. 6, 2015

(54) METHOD AND APPARATUS FOR POWER AUTOSCALING IN A RESOURCE-CONSTRAINED NETWORK

(75) Inventor: John Peter Norair, San Francisco, CA (US)

(73) Assignee: Blackbird Technology Holdings, Inc., Dover, DE (US)

(*) Notice: Subject to any disclaimer, the term of this patent is extended or adjusted under 35 U.S.C. 154(b) by 228 days.

(21) Appl. No.: 13/408,466

(22) Filed: Feb. 29, 2012

(65) Prior Publication Data

US 2012/0225687 A1    Sep. 6, 2012

Related U.S. Application Data

(60) Provisional application No. 61/464,376, filed on Mar. 2, 2011.

(51) Int. Cl.
| | |
|---|---|
| *H04L 12/26* | (2006.01) |
| *H04L 1/00* | (2006.01) |
| *H04W 56/00* | (2009.01) |

(52) U.S. Cl.
CPC .......... *H04L 43/0847* (2013.01); *H04L 1/0061* (2013.01); *H04L 43/16* (2013.01); *H04W 56/0025* (2013.01); *H04L 1/0083* (2013.01)

(58) Field of Classification Search
USPC ................. 455/522, 452.2; 370/335, 342
See application file for complete search history.

(56) References Cited

U.S. PATENT DOCUMENTS

| | | | |
|---|---|---|---|
| 5,338,625 A | 8/1994 | Bates | |
| 5,485,486 A * | 1/1996 | Gilhousen et al. | 370/335 |
| 5,615,366 A | 3/1997 | Hansen | |

(Continued)

FOREIGN PATENT DOCUMENTS

| | | |
|---|---|---|
| EP | 1321009 B1 | 1/2007 |
| JP | 2009/010449 A | 1/2009 |

(Continued)

OTHER PUBLICATIONS

PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.

(Continued)

*Primary Examiner* — Junpeng Chen
(74) *Attorney, Agent, or Firm* — McAndrews, Held & Malloy, Ltd.

(57) ABSTRACT

An electronic device may adaptively manage power consumption associated with transmission and/or reception of signals by the electronic device, wherein the adaptive power management may comprise adjusting transmit power and/or one or more power-related thresholds used during transmission or reception operations in the electronic device. Adjustments to the transmit power and/or the one or more power-related thresholds may be determined based on comparison between power measurement associated with signals received by said electronic device with original transmit power for the signals. The reception power measurement may be determined based on detected received signal strength indication (RSSI). The original transmit power may be determined based on signal transmission information embedded in at least one frame carried via said signals. The original transmission power may be embedded as an equivalent isotropic radiated power (EIRP) value.

10 Claims, 9 Drawing Sheets

(56) References Cited

U.S. PATENT DOCUMENTS

| | | | |
|---|---|---|---|
| 5,729,557 A | 3/1998 | Gardner et al. | |
| 5,959,281 A | 9/1999 | Domiteaux | |
| 6,115,379 A | 9/2000 | Flanders et al. | |
| 6,307,846 B1 | 10/2001 | Willey | |
| 6,330,700 B1 | 12/2001 | Morris | |
| 6,334,047 B1* | 12/2001 | Andersson et al. | 455/69 |
| 6,381,243 B1 | 4/2002 | Ekstedt | |
| 6,388,997 B1 | 5/2002 | Scott | |
| 6,424,301 B1 | 7/2002 | Johnson | |
| 6,452,569 B1 | 9/2002 | Park | |
| 6,512,931 B1* | 1/2003 | Kim et al. | 455/522 |
| 6,665,308 B1 | 12/2003 | Rakib | |
| 6,700,491 B2 | 3/2004 | Shafer | |
| 6,705,531 B1 | 3/2004 | Norton | |
| 6,714,559 B1 | 3/2004 | Meier | |
| 6,771,985 B1 | 8/2004 | Iinuma | |
| 7,009,941 B1 | 3/2006 | Uchino | |
| 7,233,603 B2 | 6/2007 | Lee | |
| 7,280,555 B2 | 10/2007 | Stanforth | |
| 7,292,548 B2 | 11/2007 | Lim et al. | |
| 7,305,237 B2 | 12/2007 | Stephens | |
| 7,308,103 B2 | 12/2007 | Corcoran et al. | |
| 7,315,248 B2 | 1/2008 | Egbert | |
| 7,330,446 B2 | 2/2008 | Lee | |
| 7,369,512 B1 | 5/2008 | Shurbanov et al. | |
| 7,554,981 B2 | 6/2009 | Kecskemeti | |
| 7,606,256 B2 | 10/2009 | Vitebsky | |
| 7,643,509 B2 | 1/2010 | Han et al. | |
| 7,672,284 B2 | 3/2010 | Sugar et al. | |
| 7,689,195 B2 | 3/2010 | Wu | |
| 7,698,463 B2 | 4/2010 | Ogier et al. | |
| 7,735,116 B1 | 6/2010 | Gauvin | |
| 7,760,689 B2 | 7/2010 | Shin | |
| 7,805,129 B1 | 9/2010 | Issa | |
| 7,814,107 B1 | 10/2010 | Thirumalai et al. | |
| 7,890,839 B2 | 2/2011 | Iwami | |
| 7,941,197 B2 | 5/2011 | Jain et al. | |
| 7,962,361 B2 | 6/2011 | Ramchandani | |
| 8,035,488 B2 | 10/2011 | Shiotsu et al. | |
| 8,036,715 B2 | 10/2011 | Buck | |
| 8,325,665 B2 | 12/2012 | Kim et al. | |
| 8,351,409 B2 | 1/2013 | Albert | |
| 8,554,271 B2 | 10/2013 | Wang et al. | |
| 8,599,687 B1 | 12/2013 | Kleyman et al. | |
| 2002/0022495 A1* | 2/2002 | Choi et al. | 455/522 |
| 2002/0025823 A1 | 2/2002 | Hara | |
| 2002/0078045 A1 | 6/2002 | Dutta | |
| 2003/0115369 A1 | 6/2003 | Walter | |
| 2003/0154243 A1 | 8/2003 | Crockett | |
| 2003/0183691 A1 | 10/2003 | Lahteenmaki | |
| 2004/0157631 A1 | 8/2004 | Stobart | |
| 2004/0218557 A1 | 11/2004 | Kim et al. | |
| 2005/0078038 A1 | 4/2005 | Takaki | |
| 2005/0083943 A1 | 4/2005 | Lee et al. | |
| 2005/0128086 A1 | 6/2005 | Brown | |
| 2005/0135291 A1 | 6/2005 | Ketchum et al. | |
| 2005/0139685 A1 | 6/2005 | Kozlay | |
| 2005/0174953 A1 | 8/2005 | Ho | |
| 2006/0002312 A1 | 1/2006 | Delattre et al. | |
| 2006/0088021 A1 | 4/2006 | Nelson et al. | |
| 2006/0091223 A1 | 5/2006 | Zellner | |
| 2006/0165024 A1 | 7/2006 | Iwami | |
| 2006/0175420 A1 | 8/2006 | Satou | |
| 2006/0184860 A1 | 8/2006 | Takagi | |
| 2006/0205343 A1 | 9/2006 | Runyon et al. | |
| 2006/0219776 A1 | 10/2006 | Finn | |
| 2006/0220867 A1 | 10/2006 | Dixon | |
| 2006/0238419 A1* | 10/2006 | Bucknor et al. | 342/357.09 |
| 2007/0000316 A1 | 1/2007 | Lauer | |
| 2007/0010928 A1 | 1/2007 | Brusarosco | |
| 2007/0026891 A1 | 2/2007 | Lai et al. | |
| 2007/0058661 A1 | 3/2007 | Chow | |
| 2007/0083924 A1 | 4/2007 | Lu | |
| 2007/0099641 A1 | 5/2007 | Lastinger | |
| 2007/0113636 A1 | 5/2007 | Huang et al. | |
| 2007/0125836 A1 | 6/2007 | McAllister et al. | |
| 2007/0136509 A1 | 6/2007 | Agami | |
| 2007/0183366 A1 | 8/2007 | Park | |
| 2007/0232281 A1 | 10/2007 | Nakai | |
| 2007/0254619 A1 | 11/2007 | Salomone et al. | |
| 2007/0295074 A1 | 12/2007 | Kobayakawa | |
| 2008/0041936 A1 | 2/2008 | Vawter | |
| 2008/0069097 A1 | 3/2008 | Motegi | |
| 2008/0075123 A1 | 3/2008 | Fourcand | |
| 2008/0107060 A1 | 5/2008 | Andou et al. | |
| 2008/0130597 A1 | 6/2008 | Kalhan | |
| 2008/0164325 A1 | 7/2008 | Borracci | |
| 2008/0172357 A1 | 7/2008 | Rechis | |
| 2008/0186857 A1 | 8/2008 | Becker | |
| 2008/0186867 A1 | 8/2008 | Schoo et al. | |
| 2008/0209322 A1 | 8/2008 | Kaufman | |
| 2008/0219323 A1 | 9/2008 | Desai et al. | |
| 2008/0228592 A1 | 9/2008 | Kotas | |
| 2008/0238621 A1 | 10/2008 | Rofougaran | |
| 2008/0256409 A1 | 10/2008 | Oran et al. | |
| 2008/0279210 A1 | 11/2008 | Naka et al. | |
| 2008/0302177 A1 | 12/2008 | Sinnett | |
| 2008/0320139 A1 | 12/2008 | Fukuda | |
| 2009/0003376 A1 | 1/2009 | Horvat | |
| 2009/0006376 A1 | 1/2009 | Hendriks et al. | |
| 2009/0034491 A1 | 2/2009 | Adams | |
| 2009/0055377 A1 | 2/2009 | Hedge | |
| 2009/0069049 A1 | 3/2009 | Jain | |
| 2009/0073070 A1 | 3/2009 | Rofougaran | |
| 2009/0113267 A1 | 4/2009 | Harrison | |
| 2009/0138948 A1 | 5/2009 | Calamera | |
| 2009/0141531 A1 | 6/2009 | Abedin | |
| 2009/0150646 A1 | 6/2009 | Allen | |
| 2009/0171749 A1 | 7/2009 | Laruelle | |
| 2009/0171947 A1 | 7/2009 | Karayel | |
| 2009/0196279 A1 | 8/2009 | Kim et al. | |
| 2009/0210898 A1 | 8/2009 | Childress et al. | |
| 2009/0251295 A1 | 10/2009 | Norair | |
| 2009/0268674 A1 | 10/2009 | Liu | |
| 2009/0279652 A1 | 11/2009 | Sinha | |
| 2009/0286496 A1 | 11/2009 | Yavuz et al. | |
| 2009/0292418 A1 | 11/2009 | Kuykendal | |
| 2010/0011156 A1 | 1/2010 | Yim | |
| 2010/0026589 A1 | 2/2010 | Dou | |
| 2010/0027558 A1 | 2/2010 | Han | |
| 2010/0036806 A1 | 2/2010 | Lam et al. | |
| 2010/0052859 A1 | 3/2010 | Lossau | |
| 2010/0078471 A1 | 4/2010 | Lin | |
| 2010/0097946 A1 | 4/2010 | Celentano | |
| 2010/0097956 A1 | 4/2010 | Tauil | |
| 2010/0097957 A1 | 4/2010 | Pirzada et al. | |
| 2010/0118737 A1 | 5/2010 | Kim | |
| 2010/0162069 A1 | 6/2010 | Niu et al. | |
| 2010/0177696 A1 | 7/2010 | Jung | |
| 2010/0179877 A1 | 7/2010 | Lam | |
| 2010/0181377 A1 | 7/2010 | Chen | |
| 2010/0190437 A1 | 7/2010 | Buhot | |
| 2010/0197261 A1 | 8/2010 | Zibrik et al. | |
| 2010/0228617 A1 | 9/2010 | Ransom et al. | |
| 2010/0232408 A1 | 9/2010 | Lim | |
| 2010/0256976 A1 | 10/2010 | Atsmon | |
| 2010/0261496 A1 | 10/2010 | Fukumoto et al. | |
| 2010/0280904 A1 | 11/2010 | Ahuja | |
| 2010/0295681 A1 | 11/2010 | Burns et al. | |
| 2010/0303051 A1 | 12/2010 | Umeuchi et al. | |
| 2010/0313241 A1* | 12/2010 | Lee et al. | 726/3 |
| 2011/0003601 A1 | 1/2011 | Forenza et al. | |
| 2011/0007733 A1 | 1/2011 | Kubler et al. | |
| 2011/0064013 A1 | 3/2011 | Liu et al. | |
| 2011/0074552 A1 | 3/2011 | Norair | |
| 2011/0111766 A1* | 5/2011 | Yang et al. | 455/452.2 |
| 2011/0112892 A1 | 5/2011 | Tarantino | |
| 2011/0116513 A1 | 5/2011 | Gilson | |
| 2011/0156872 A1 | 6/2011 | Wengrovitz | |
| 2011/0191657 A1 | 8/2011 | Bliss et al. | |
| 2011/0268024 A1 | 11/2011 | Jamp et al. | |
| 2011/0306384 A1* | 12/2011 | Wei | 455/522 |
| 2011/0316716 A1 | 12/2011 | MacKay et al. | |
| 2012/0001730 A1 | 1/2012 | Potyrailo | |

(56) References Cited

U.S. PATENT DOCUMENTS

| | | | |
|---|---|---|---|
| 2012/0039265 A1* | 2/2012 | Patel et al. | 370/329 |
| 2012/0059936 A1 | 3/2012 | Bauchot et al. | |
| 2012/0086615 A1 | 4/2012 | Norair | |
| 2012/0087267 A1 | 4/2012 | Norair | |
| 2012/0087350 A1 | 4/2012 | Norair | |
| 2012/0088449 A1 | 4/2012 | Norair | |
| 2012/0093151 A1 | 4/2012 | McFarland et al. | |
| 2012/0116694 A1 | 5/2012 | Norair | |
| 2012/0116887 A1 | 5/2012 | Norair | |
| 2012/0118952 A1 | 5/2012 | Norair | |
| 2012/0191848 A1 | 7/2012 | Norair | |
| 2012/0191901 A1 | 7/2012 | Norair | |
| 2012/0201246 A1 | 8/2012 | Fernandez | |
| 2012/0207141 A1 | 8/2012 | Norair | |
| 2012/0209716 A1 | 8/2012 | Burns | |
| 2012/0224491 A1 | 9/2012 | Norair | |
| 2012/0224530 A1 | 9/2012 | Norair | |
| 2012/0224543 A1 | 9/2012 | Norair | |
| 2012/0224590 A1 | 9/2012 | Norair | |
| 2012/0226822 A1 | 9/2012 | Norair | |
| 2012/0226955 A1 | 9/2012 | Norair | |
| 2013/0017788 A1 | 1/2013 | Norair | |
| 2013/0210461 A1 | 8/2013 | Moldavsky et al. | |
| 2014/0241197 A1* | 8/2014 | Baldemair et al. | 370/252 |

FOREIGN PATENT DOCUMENTS

| | | | |
|---|---|---|---|
| WO | 2006001556 A1 | 1/2006 | |
| WO | 2009023592 A2 | 2/2009 | |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).

PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and the Written Opinion of the International Searching Authority, or the Declaration, in International application No. PCT/US11/059304, dated Mar. 9, 2012 (11 pages).

PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and the Written Opinion of the International Searching Authority, or the Declaration, in International application No. PCT/US12/22005, dated Mar. 29, 2012. (12 pages).

PCT International Searching Authority, Notification Concerning Transmittal of the International Search Report and the Written Opinion of the International Searching Authority, or the Declaration, in International application No. PCT/US12/22002, dated May 8, 2012. (13 pages).

PCT International Searching Authority, Notification Concerning Transmittal of the International Search Report and the Written Opinion of the International Searching Authority, or the Declaration, in International application No. PCT/US2012/025191, dated May 25, 2012 (8 pages).

PCT International Searching Authority, Notification Concerning Transmittal of the International Search Report and the Written Opinion of the International Searching Authority, or the Declaration, in International application No. PCT/US2012/025197 dated May 25, 2012 (7 pages).

PCT International Searching Authority, Notification Concerning Transmittal of the International Search Report and the Written Opinion of the International Searching Authority, or the Declaration, in International application No. PCT/US2012/027382 dated May 31, 2012 (10 pages).

PCT International Searching Authority, Notification Concerning Transmittal of the International Search Report and the Written Opinion of the International Searching Authority, or the Declaration, in International application No. PCT/US2012/027381 dated May 31, 2012 (13 pages).

PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).

Norair JP (2009). Introduction to DASH7 Technologies 1 st Edition. Whitepaper. Mar. 16, 2009. 1-22.

Richard MacManus. DASH7: Bringing Sensor Networking to Smartphones. readwrite.com. Apr. 11, 2010. pp. 1-5.

"Mapping IP Multicast to MAC-Layer Multicast" TechNet Microsoft Library (1 page).

* cited by examiner

METHOD AND APPARATUS FOR POWER AUTOSCALING IN A RESOURCE-CONSTRAINED NETWORK

CLAIM OF PRIORITY

This patent application makes reference to, claims priority to and claims benefit from U.S. Provisional Application Ser. No. 61/464,376 which was filed on Mar. 2, 2011. The above-referenced application is hereby incorporated herein by reference in its entirety.

The above-referenced application is hereby incorporated herein by reference in its entirety.

CROSS-REFERENCE TO RELATED APPLICATIONS/INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash7-Based Applications Capability to a Smartphone" and filed on Jul. 15, 2011;
U.S. patent application Ser. No. 13/267,640 titled "Method and Apparatus for Adaptive Searching of Distributed Datasets" and filed on Oct. 6, 2011;
U.S. patent application Ser. No. 13/267,621 titled "Method and Apparatus for Low-Power, Long-Range Networking" and filed on Oct. 6, 2011;
U.S. patent application Ser. No. 13/270,802 titled "Method and Apparatus for a Multi-band, Multi-mode Smartcard" and filed on Oct. 11, 2011;
U.S. patent application Ser. No. 13/270,959 titled "Method and Apparatus for an Integrated Antenna" and filed on Oct. 11, 2011;
U.S. patent application Ser. No. 13/289,054 titled "Method and Apparatus for Electronic Payment" and filed on Nov. 4, 2011;
U.S. patent application Ser. No. 13/289,050 filed on Nov. 4, 2011;
U.S. patent application Ser. No. 13/297,348 titled "Method and Apparatus for Interfacing with a Smartcard" and filed on Nov. 16, 2011;
U.S. patent application Ser. No. 13/354,513 titled "Method and Apparatus for Memory Management" and filed on Jan. 20, 2012;
U.S. patent application Ser. No. 13/354,615 titled "Method and Apparatus for Discovering, People, Products, and/or Services via a Localized Wireless Network" and filed on Jan. 20, 2012;
U.S. patent application Ser. No. 13/396,708 titled "Method and apparatus for Plug and Play, Networkable ISO 18000-7 Connectivity" and filed on Feb. 15, 2012;
U.S. patent application Ser. No. 13/396,739 titled "Method and Apparatus for Serving Advertisements in a Low-Power Wireless Network" and filed on Feb. 15, 2012;
U.S. patent application Ser. No. 13/408,440 titled "Method and Apparatus for Forward Error Correction (FEC) in a Resource-Constrained Network" and filed on Feb. 29, 2012;
U.S. patent application Ser. No. 13/408,447 titled "Method and Apparatus for Adaptive Traffic Management in a Resource-Constrained Network" and filed on Feb. 29, 2012;
U.S. patent application Ser. No. 13/408,453 titled "Method and Apparatus for Dynamic Media Access Control in a Multiple Access System" and filed on Feb. 29, 2012;
U.S. patent application Ser. No. 13/408,457 titled "Method and Apparatus for Rapid Group Synchronization" and filed on Feb. 29, 2012;
U.S. patent application Ser. No. 13/408,461 titled "Method and Apparatus for Addressing in a Resource-Constrained Network" and filed on Feb. 29, 2012; and
U.S. patent application Ser. No. 13/408,464 titled "Method and Apparatus for Query-Based Congestion Control" and filed on Feb. 29, 2012.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and an apparatus for power autoscaling in a resource-constrained network.

BACKGROUND OF THE INVENTION

Existing methods of power management in wireless devices often result in inefficient use of power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for power autoscaling in a resource-constrained network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
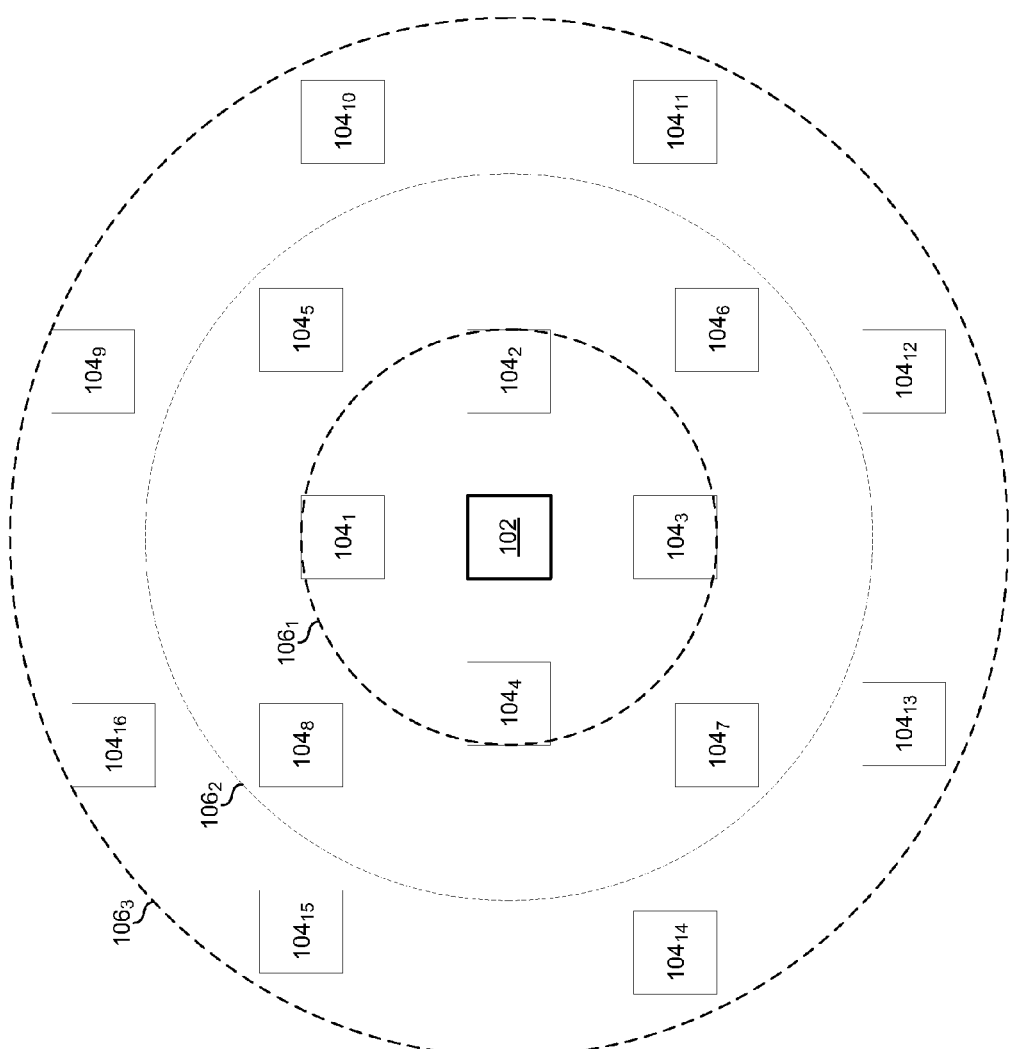
FIG. 1A is a block diagram illustrating an exemplary communication setup comprising a plurality of spatially-distributed, resource-constrained devices, which may be utilized in accordance with an embodiment of the invention.

Certain embodiments of the invention may be found in a method and apparatus for power autoscaling in a resource-constrained network. In various embodiments of the invention, An electronic device may utilize adaptive power management to adaptively control power consumption associated with communications by the electronic device. In this regard, the adaptive power management may comprise adaptively adjusting transmit power used during transmission of signals by the electronic device. The transmit power used during transmission of signals by the electronic device may be adjusted based on a determination of a desired maximum communication range and/or selection (and locating) a particular target peer device. The adaptive adjusting of transmit power may be based on received signal strength of a received frame and based on a power at which the received frame was transmitted, and power at which the received frame was transmitted is embedded in the received frame. The original transmittal power may be embedded in the received frame as an equivalent isotropic radiated power (EIRP) value. Accordingly, the desired maximum communication range (and/or locating the target peer device) may be determined based on calculation of power loss associated with communication of received frames. In this regard, the power loss associated with communication of the received frames may be determined based on difference between the received signal strength of the received frame and the power at which the received frame was transmitted. The adaptive power management may also comprise adaptively adjusting reception sensitivity applicable during reception of signals by the electronic device. The reception sensitivity may be adjusted based on a determination of a desired maximum communication range and/or selection (and locating) a particular target peer device. The reception sensitivity may control discarding of received frames, and terminating processing thereof. The reception sensitivity of the electronic device may be adjusted by adaptively adjusting one or more power-related thresholds used during reception of signals by the electronic device. The one or more power-related thresholds may comprise a threshold for controlling Carrier Sense Multiple Access (CSMA) based operations in the electronic device, whereby such threshold may be compared to received signal strength indication (RSSI) detected by the electronic device. The one or more power-related thresholds may also comprise a threshold for controlling link quality, whereby the controlling comprise discarding frames carried via received signals based on comparison of link utilization with the link quality threshold. The adaptive power management may be configured and/or applied in accordance with a particular power management algorithm selected from a plurality of available algorithms; comprising standards based algorithms and/or proprietary algorithms. Furthermore, the adaptive power management may be selectively activate or deactivated.

FIG. 1A is a block diagram illustrating an exemplary communication setup comprising a plurality of spatially-distributed, resource-constrained devices, which may be utilized in accordance with an embodiment of the invention. Referring to FIG. 1 there is shown a first device 102, second devices $104_1$-$104_{16}$, and perimeters $106_1$-$106_3$.

The first device 102 may comprise suitable logic, circuitry, interfaces, and/or code operable to transmit and receive wireless signals in accordance with one or more wireless protocols. Exemplary protocols which may be supported by the device 102 may include the ISO 18000-7 protocol, and protocols described in the above-incorporated U.S. Provisional Patent Application having Ser. No. 61/464,376 and filed on Mar. 2, 2011. The first device 102 may be less resource-constrained device. In this regard, the first device 102 may be, for example and without limitation, a laptop computer, a desktop computer, a tablet computer, a smart phone, a server, a set-top box, a gateway, a base station, a meter or code reader, or may comprise a combination of one or more such devices.

Each of the second devices $104_1$-$104_{16}$ may comprise suitable logic, circuitry, interfaces, and/or code operable to transmit and receive wireless signals in accordance with one or more wireless protocols, which may include the ISO 18000-7 standard, and protocols described in the above-incorporated U.S. Provisional Patent Application having Ser. No. 61/464,376 and filed on Mar. 2, 2011. Each of the second devices $104_1$-$104_{16}$ may be operable to store data (e.g., in the form of delimited strings of characters). At least some of the second devices $104_1$-$104_{16}$ may be more resource-constrained devices. In this regard, one or more of the second devices $104_1$-$104_{16}$ may have relatively little memory, relatively little processing power, operate on battery power, and/or may otherwise be constrained in terms of one or more resources. The second devices $104_1$-$104_{16}$ may comprise, for example, RFID tags, smartcards, keyfobs, cellphones, portable media players, appliances, and/or utility meters.

The second devices $104_1$-$104_{16}$ may be located at different distances relative to the first device 102. Accordingly, the perimeters $106_1$-$106_3$ may represent and/or delineate different zones of operations for the first device 102. Perimeters $106_1$-$106_3$ may correspond to, for example, three different transmit powers that may be utilized by device 102. That is, the device 102 may utilize a first transmit power $T_1$ to communicate with devices within the first perimeter $106_{16}$, utilize a second transmit power $T_2$ to communicate with devices within the second perimeter $106_2$, and utilize a third transmit power $T_3$ to communicate with devices within the third perimeter $106_3$, wherein $T_3 > T_2 > T_1$.

In operation, the device 102 may communicate one or more of the devices $104_1$-$104_{16}$. In this regard, communications among the devices 102 and $104_1$-$104_{16}$ may be based on the ISO 18000-7 protocol, and/or similar protocols such as the protocols described in the above-incorporated U.S. Provisional Patent Application having Ser. No. 61/464,376 and filed on Mar. 2, 2011. Use of such protocols may be used for low-power, long range communication, such as to enable RFID and like exchanges among the devices 102 and $104_1$-$104_{16}$. For example, at the 433 MHz band, low power communication based on such protocols may be in the range of 1-2000 m.

In various embodiments of the invention, the devices 102 and $104_1$-$104_{16}$ may be operable to support and/or use adaptive power control mechanisms, to enhance power consumption in the network established among these devices. In this regard, such adaptive power control mechanism may incorporate use of adaptive power autoscaling, in which transmission and/or reception operations, and parameter(s) related thereto, in the devices may be continually adjusted in accordance with increases or decreases in transmission and/or reception ranges. For example, the device 102 may selectively communicate with a subset of the devices $104_1$-$104_{16}$. Such selective communication may enable use of different transmission powers, based on determination of particular target devices for communication therewith. In this regard, the device 102 may initially search for particular one or more of the devices $104_1$-$104_{16}$. The search may be performed by locating devices having a particular string (e.g., a group of one or more ASCII or UNICODE characters). The device 102 may generate a search request packet and transmit the search request packet. If the search request packet is transmitted at power $T_1$, the search request packet may be received by data-bearing devices $104_1$-$104_4$. If the search request packet is transmitted at power $T_2$, the search request packet may be received by devices $104_1$-$104_8$. If the search request packet is transmitted at power $T_3$, the search request packet may be received by devices $104_1$-$104_{16}$. Note that the above assumes signal propagation in the absence of interference or physical obstructions that critically impair communications between the device 102 and one or more of the devices $104_1$-$104_{16}$.

Figure 1B:
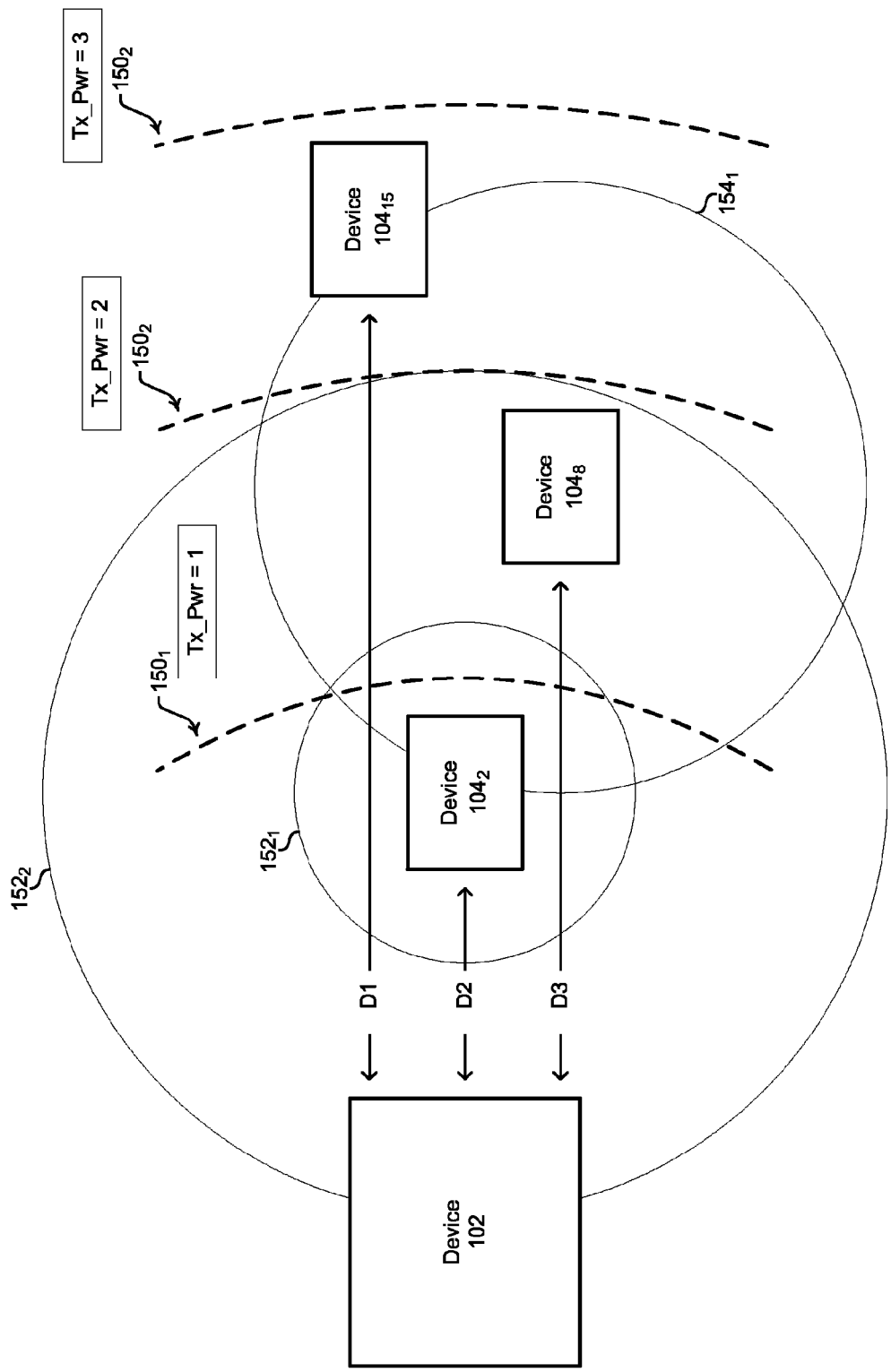
FIG. 1B is a block diagram illustrating use of adaptive power autoscaling in electronic devices, in accordance with the embodiment of the invention.

FIG. 1B is a block diagram illustrating use of adaptive power autoscaling in electronic devices, in accordance with the embodiment of the invention. Referring to FIG. 1B, there is shown devices 102, $104_2$, $104_8$, and $104_{15}$ of FIG. 1A.

In operation, devices in a resource-constrained network, such as devices 102, $104_2$, $104_8$, and $104_{15}$ may utilize adaptive power autoscaling to enhance and/or optimize power consumption in these devices during interactions therebetween. In this regard, adaptive power autoscaling may comprise adaptively and/or dynamically adjusting power-related parameters associated with communication operations, to control power consumption and/or requirement. Power scaling is adaptive in that power-related parameters may be set and/or adjusted based on specific communication objectives. These objectives may comprise reaching (or not) particular device(s) when transmitting, and/or being able to receive (or not) signals from particular device(s).

For example, during adaptive power autoscaling, transmission power and/or minimum receive power-related thresholds may be adjusted, such as based on selection and/or locating of other devices to engage in communication therewith. The transmit power may be, for example, increased or decreased to ensure that a particular device is (not) reached. In other words, the transmitting device would only apply, at any given point, the maximum transmit power required to reach, at most, the target device. For example, the device 102 may use transmit power (Tx_Pwr) value 1, corresponding to transmission range $150_1$, when seeking to only communicate with device $104_2$. The device 102 may then increase its transmit power to higher value, Tx_Pwr value 2, corresponding to increased transmission range $150_2$, when trying to transmit to device $104_8$; and may then increase its transmit power to even higher value, Tx_Pwr value 3, corresponding to increased transmission range $150_3$, when trying to transmit to device $104_{15}$.

Similarly, the adaptive power autoscaling may be applied by setting and/or adjusting parameters and/or threshold used in and/or relating to signal reception, thus effectively adjusting the reception range. For example, if the device 102 were to transmit at a fixed power T1, reception sensitivity and/or thresholds in the device $104_2$ may be initially set such that the device $104_2$ may receive the signal transmitted at power T1 over a reception range $152_2$. When the device $104_2$ no longer desires to receive signals from device 102, reception sensitivity and/or thresholds in the device $104_2$ may be set or modified such that the device $104_2$ may receive a signal transmitted at T1 over a smaller reception range $152_1$, and thus signals transmitted by device 102 would not be received, or would be received but then ignored or discarded.

In some instances adjusting one side (e.g. transmission) may be performed adaptively based on monitoring of the other side (e.g. reception). For example, if the device 102 transmits at Tx_Pwr=2 in an attempt to communicate with device $104_8$, but the receive sensitivity and/or threshold(s) of device $104_8$ is configured such that it receives signals transmitted at Tx_Pwr=2 only over the reception range $154_1$, then the device $104_8$ may not receive the signals transmitted by device 102. Consequently, the device may abort its attempt to communicate with device $104_8$ or may increase its transmit power to Tx_Pwr=3 in an attempt to reach device $104_8$. If the device 102 aborts attempting to communicate with device $104_8$, it may return (e.g., after a preconfigured interval) to transmitting at Tx_Pwr=1, which requires less transmit power thus reducing unnecessary power consumption.

While the invention has been described herein with respect to the device 102, which is previously described as being the less resource-constrained device, the invention is not so limited. In this regard, in various embodiments of the invention, each of the devices, both less resource-constrained devices and more resource-constrained devices, may be operable to implement similar mechanisms for adaptive controlling and/or adjusting transmission and/or reception operations. For example, the device 102 may also be continually adjusting its reception range, by adjusting various parameters that may control reception sensitivity; and each of the devices $104_2$, $104_8$, and $104_{15}$ may also be operable to adjust their transmission ranges, by adjusting the transmission power for example, based on target devices for communication.

Figure 2A:
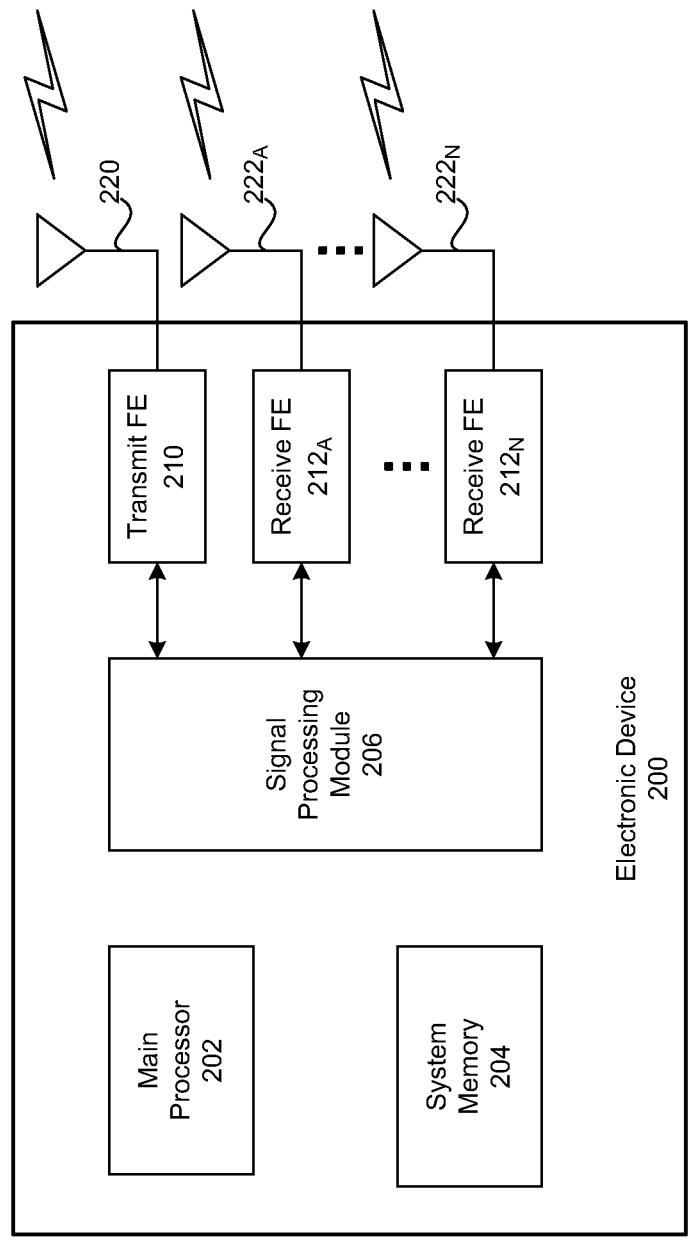
FIG. 2A is a block diagram illustrating an exemplary electronic device that may support adaptive power autoscaling, in accordance with an embodiment of the invention.

FIG. 2A is a block diagram illustrating an exemplary electronic device that may support adaptive power autoscaling, in accordance with an embodiment of the invention. Referring to FIG. 2A there is shown an electronic device 200.

The electronic device 200 may be similar to the electronic devices 102 and/or 104x of FIGS. 1A and 1B, and may comprise suitable logic, circuitry, interfaces, and/or code that may be operable to implement various aspects of the invention. The electronic device 200 may comprise, for example, a host processor 202, a system memory 204, a signal processing module 206, a transmit front-end (FE) 210, a transmission antenna 220, a plurality of receive front-ends (FE) $212_A$-$212_N$, and plurality of reception antennas $222_A$-$222_N$.

The host processor 202 may comprise suitable logic, circuitry, interfaces, and/or code that may be operable to process data, and/or control and/or manage operations of the electronic device 200, and/or tasks and/or applications performed therein. In this regard, the host processor 202 may be operable to configure and/or control operations of various components and/or subsystems of the electronic device 200, by utilizing, for example, one or more control signals. The host processor 202 may enable execution of applications, programs and/or code, which may be stored in the system memory 204, for example.

The system memory 204 may comprise suitable logic, circuitry, interfaces, and/or code that may enable permanent and/or non-permanent storage, buffering, and/or fetching of data, code and/or other information, which may be used, consumed, and/or processed in the electronic device 200. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The signal processing module 206 may comprise suitable logic, circuitry, interfaces, and/or code for enabling processing of signals transmitted and/or received by the electronic device 200. The signal processing module 206 may be operable to perform such signal processing operation as filtering, amplification, up-convert/down-convert baseband signals, analog-to-digital conversion and/or digital-to-analog conversion, encoding/decoding, encryption/decryption, and/or modulation/demodulation. The signal processing module 206 may be operable and/or configured to support low-power wireless protocol, such as ISO 18000-7, protocols described in the above-incorporated U.S. Provisional Patent Application having Ser. No. 61/464,376, and/or similarly structured standards.

The transmit FE 210 may comprise suitable logic, circuitry, interfaces, and/or code that may be operable to perform wireless transmission, such as over a plurality of supported RF bands. The transmit FE 210 may enable, for example, performing wireless communications of RF signals via the transmission antenna 220. In this regard, the transmission antenna 220 may comprise suitable logic, circuitry, interfaces, and/or code that may enable transmission of wireless signals within certain bandwidths and/or based on certain protocols. For example, one or more of the transmission antenna 220 may enable transmission over the 433 MHz band, which may be suitable for ISM communication based on, for example, ISO 18000-7, protocols described in the above-incorporated U.S. Provisional Patent Application having Ser. No. 61/464,376, and/or similar related protocols.

Each of the plurality of receive FEs $212_A$-$212_N$ may comprise suitable logic, circuitry, interfaces, and/or code that may be operable to perform wireless reception, such as over a plurality of supported RF bands. Each of the plurality of receive FEs $212_A$-$212_N$ may enable, for example, performing wireless communications of RF signals via corresponding one of the plurality of reception antennas $222_A$-$222_N$. Each of the plurality of reception antennas $222_A$-$222_N$ may comprise suitable logic, circuitry, interfaces, and/or code that may enable reception of wireless signals within certain bandwidths and/or based on certain protocols. For example, one or more of the plurality of reception antennas $222_A$-$222_N$ may enable reception of signals communicated over different channels within the 433 MHz band, which may be suitable for ISM communication based on, for example, ISO 18000-7, protocols described in above-incorporated U.S. Provisional Patent Application having Ser. No. 61/464,376, and/or similar related protocols.

In various embodiments of the invention, the electronic device 200 may support and/or implement adaptive power autoscaling. In this regard, power consumption during transmission and/or reception of signals may be adaptively scaled by continually controlling and/or adjusting components, processes, and/or functions relating to and/or affecting (or being affected by) transmission and/or reception of signals. In this regard, the power scaling may be achieved by adjusting transmit and/or reception related parameters in a manner that causes changes to power requirement and/or consumption. This may particularly impact and/or relate to the transmit FE 210 and the receive FEs $212_A$-$212_N$ (or their components), and/or operations thereof, as described in more detail with respect to FIG. 2B.

Figure 2B:
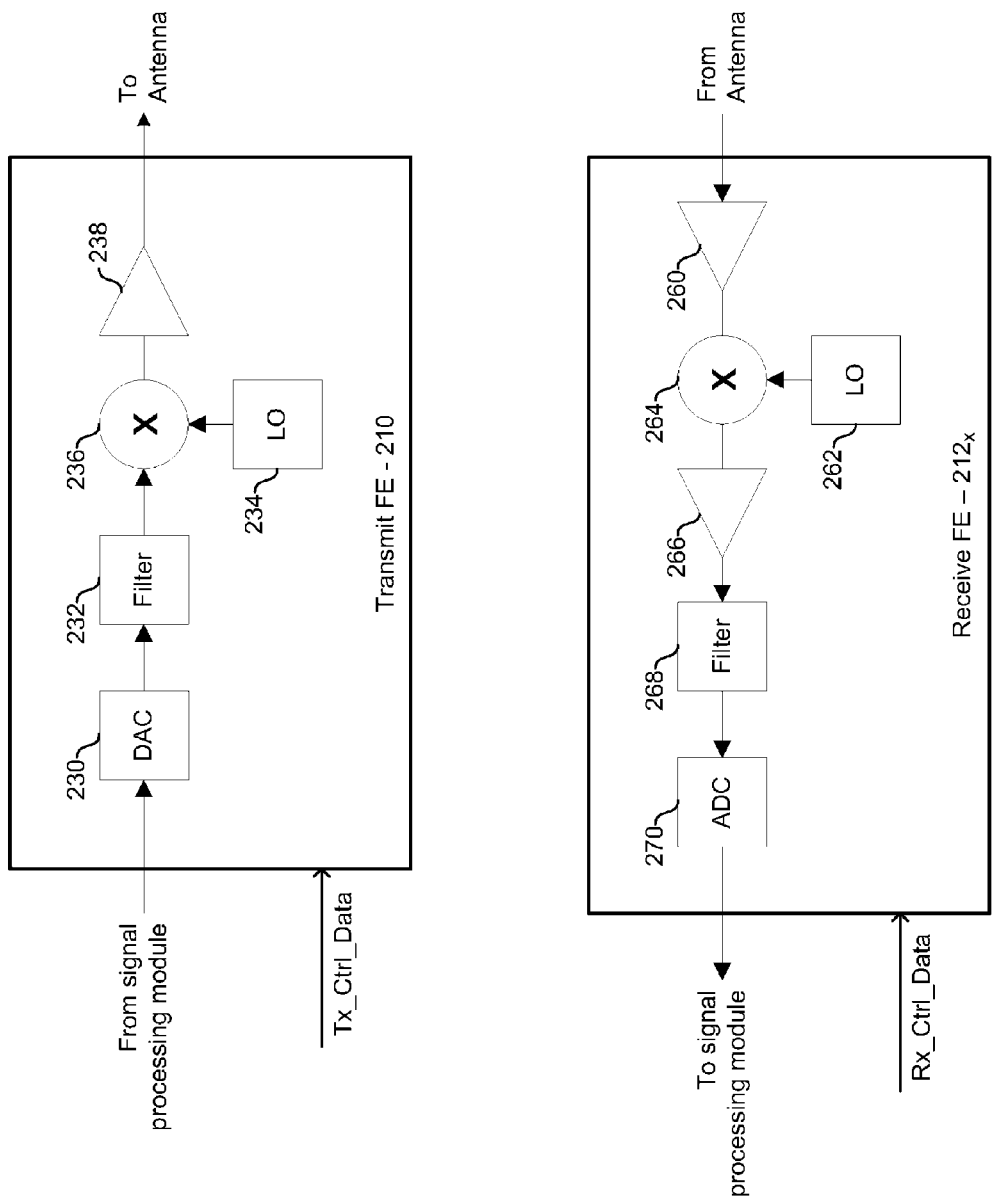
FIG. 2B is a diagram of an exemplary transmit front-end (FE) and an exemplary receive front-end (FE) in an electronic device that supports adaptive power autoscaling, in accordance with an embodiment of the invention.

FIG. 2B is a diagram of an exemplary transmit front-end (FE) and an exemplary receive front-end (FE) in an electronic device that supports adaptive power autoscaling, in accordance with an embodiment of the invention. Referring to FIG. 2B, there is shown the transmit FE 210 of FIG. 2A, and receive FE $212_x$, which corresponds to any of the receive FEs $212_A$-$212_N$ of FIG. 2A.

The transmit FE 210 may comprise a digital-to-analog converter (DAC) 230, a filter 232, a local oscillator (LO) 234, a mixer 236, and an amplifier 238. The filter 232 may comprise a low pass filter (LPF). The amplifier 238 may be a power amplifier (PA).

The receive FE $212_x$ may comprise amplifiers 260 and 266, a mixer 264, a local oscillator (LO) 262, a filter 268, and an analog-to-digital converter (ADC) 270. The filter 268 may comprise a low pass filter (LPF). The amplifiers 260 and/or 266 may be, for example, low noise amplifiers (LNAs).

In operation, the transmit FE 210 may be utilized in handling signals transmitted wirelessly via corresponding antenna 220, to facilitated proper transmission thereby. In this regard, the digital-to-analog converter (DAC) 230 may receive digital signals from, for example, the signal processing module 206. The digital-to-analog converter (DAC) 230 may convert the digital signals to analog signals, and the analog signals may be communicated to the filter 232. The filter 232, which may be low pass filter (LPF), may attenuate frequencies above a determined frequency, while passing frequencies below the determined frequency. The filter 232 may also provide amplification to the filtered signal such that the amplitude of the output signal may have a gain with respect to the amplitude of the input signal. The output of the filter 232 may be communicated to the mixer 236. The mixer 236 may be an amplifying mixer that may up-convert the frequency of the input signal to generate an output signal. The output signal may also have an amplitude gain with respect to the amplitude of the input signal. The frequency of the output signal of the mixer 236 may depend on, for example, a frequency of a signal generated by the local oscillator (LO) 234. The output frequency may be a sum of the frequency of the signal from the filter 232 and the frequency of the signal from the local oscillator (LO) 234. The output of the mixer 236 may be communicated to the amplifier 238, which may generate an output signal that may have an amplitude gain with respect to the amplitude of the input signal. The amplifier 238 may be a power amplifier whose output may be transmitted by the antenna 201, for example.

The receive FE $212_x$ may be utilized in handling signals received via corresponding antenna $222_x$, to facilitated subsequent processing thereof, such as via the signals processing module 206, to enable extracting data carried thereby. In this regard, the amplifier 260, which may be a low noise amplifier (LNA), may amplify received RF signals from the antenna $222_x$. The mixer 264 may be an amplifying mixer that may down-convert the frequency of the input signal to generate an output signal. The output signal may also have an amplitude gain with respect to the amplitude of the input signal. The frequency of the output signal of the mixer 264 may depend on, for example, a frequency of a signal generated by the local oscillator (LO) 262. The output frequency may be a difference of the frequency of the signal from the amplifier 260 and the frequency of the signal from the local oscillator (LO) 262. The output of the mixer 264 may be communicated to the amplifier 266, which may generate an output signal that may have an amplitude gain with respect to the amplitude of the input signal. The output of the amplifier 266 may be communicated to the filter 268. The filter 268 may attenuate frequencies above a determined frequency, while passing frequencies below the determined frequency. The filter 268 may also provide amplification to the filtered signal such that the amplitude of the output signal may have a gain with respect to the amplitude of the input signal. The output of the filter 268 may be communicated to the analog-to-digital converter (ADC) 270. The analog-to-digital converter (ADC) 270 may convert the analog signals to digital signals by periodically sampling the analog signals. The output of the analog-to-digital converter (ADC) 270 may be communicated, for example, to the signal processing module 206 for further processing.

In an exemplary aspect of the invention, various components of the transmit FE 210 and/or the receive FE $212_x$ may be adaptively controlled, and/or their operations may be adjusted. For example, gain of the amplifiers 260 and 266, as well as the mixer 264 and the filter 268 of the receive FE $212_x$ may be set and/or adjusted up or down, to provide appropriate signal levels at each block, for enabling or blocking handling of particular signals at that block. The frequency of the signal generated by the local oscillator (LO) 262 may also be controlled to enable adjusting and/or controlling the signals outputted by mixer 264—e.g., to generate an output with a constant frequency as the frequency of the signal from the amplifier 260 varies. This may allow the electronic device 200 to tune to different channels, or frequencies. Similarly, gain of the amplifier 238, as well as the mixer 236 and the filter 232 may be set and/or adjusted up or down to provide appropriate signal levels at each block, for enabling or blocking handling of particular signals at that block. Also, the frequency of the signal generated by the local oscillator (LO) 234 may also be controlled so that the mixer 236 may generate a particular desired output frequency for transmission.

In an embodiment of the invention, the adaptive control of the transmit FE 210 and/or the receive FE $212_x$, and/or their components, and/or the adjustment of operations thereof, may be utilized to enable adaptive power autoscaling operations in the electronic device 200. In this regard, the ability to control various parameters for the receive FE $212_x$ and/or the transmitter 210 may be useful in instances when different transmit power and/or different reception sensitivities are desired. Accordingly, gain for the various components in the receive FE $212_x$ and/or the transmit FE 210 may be adjusted to use particular transmit power level, during transmission operations, and/or to be optimized for particular power levels when handling received signals.

In an embodiment of the invention, the configuring may be performed by use of control signals (shown in FIG. 3B as Tx_Ctrl_Data and Rx_Ctrl_Data) which may specify particular changes to the receive FE $212_x$ and/or the transmitter 210, or any components thereof, to achieved optimized transmission and/or reception power consumption. In this regard, the electronic device 200 may maintain a data structure that may specify the particular required adjustment corresponding to particular transmission power level and/or reception sensitivity.

Figure 3A:
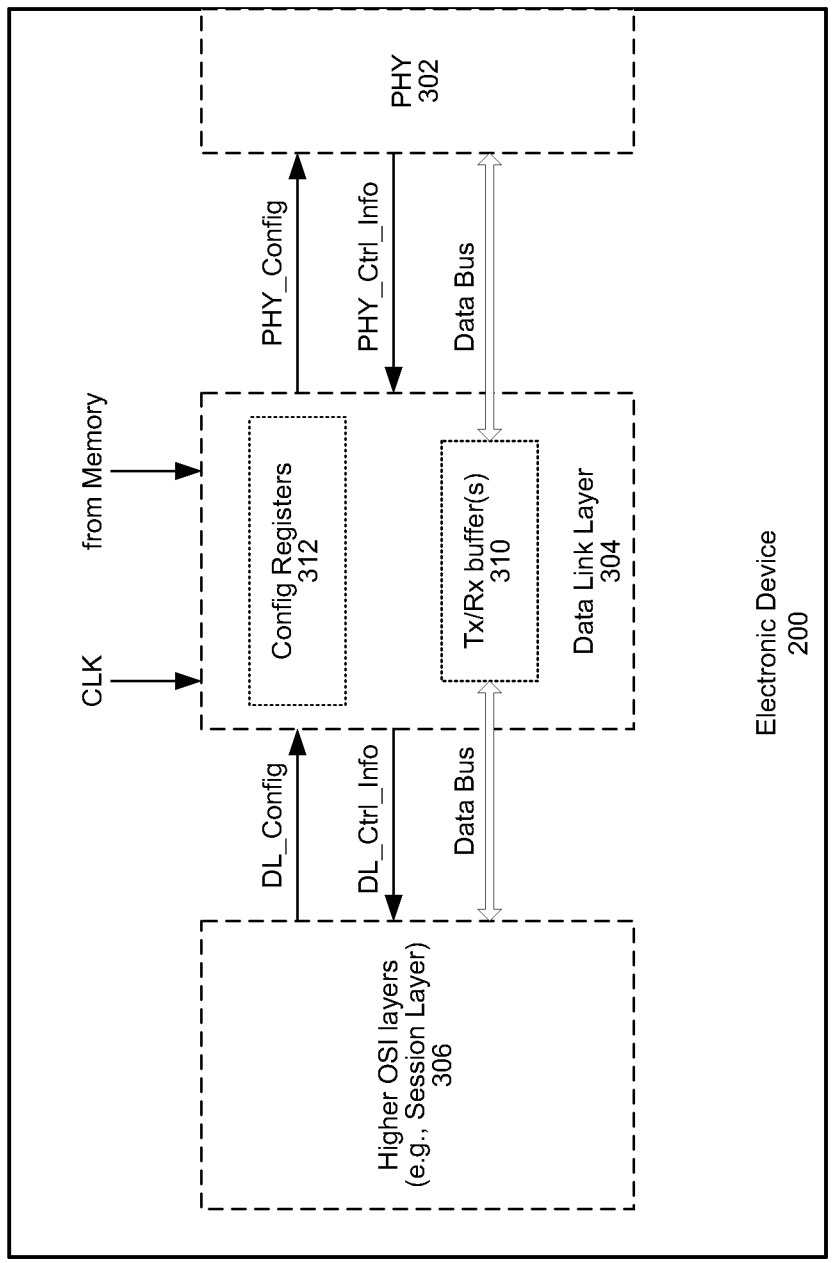
FIG. 3A is a block diagram illustrating an exemplary implementation of the OSI model within an electronic device that may support adaptive power autoscaling, in accordance with an embodiment of the invention.

FIG. 3A is a block diagram illustrating an exemplary implementation of the OSI model within an electronic device that may support adaptive power autoscaling, in accordance with an embodiment of the invention. Referring to FIG. 3A, there is shown the device 200 of FIG. 2A.

The device 200 may be operable and/or configured to incorporate an OSI-mode-based implementation in accordance with, for example, the protocol described in the above-incorporated U.S. Provisional Patent Application having Ser. No. 61/464,376 and filed on Mar. 2, 2011. In this regard, the 7 OSI layers may be implemented via one or more physical components of the device 200. For example, the Physical (PHY) Layer (layer 1 of the OSI model) may be implemented via the transmit FE 210 and the receive FE $212_A$-$212_N$; the Data Link Layer (layer 2 of the OSI model) and the Network Layer (layer 3 of the OSI model) may be implemented via the signal processing module 206; while the remaining layers, comprising the Transport Layer (layer 4 of the OSI model), the Session Layer (layer 5 of the OSI model), the Presentation Layer (layer 6 of the OSI model), and the Application Layer (layer 7 of the OSI model) may be implemented via the main processor 202. In an exemplary embodiment, the main processor 202, the system memory 204, and the signal processing module 206 may be implemented in a first chip (e.g., a microcontroller) and the FEs 210, $212_A$-$212_N$ may be implemented in a second chip.

During communication from and/or to the device 200, the seven OSI layers may perform different functions and/or processes that may enable such communication, and/or enable controlling various aspects related thereto. In this regard, the OSI module implementation may typically be utilized in facilitating communication of data, which may comprise providing required header/footer encapsulation and/or stripping, with data being internally exchanged between the OSI layers, or the physical components in which they are implemented, via data buses for example. The handling of data (e.g. encapsulation or stripping) may require buffering of data by one or more OSI layers, as demonstrated by use of transmit/receive (Tx/Rx) buffers 310 in the Data Link Layer 304.

During control and/or configuration of the OSI model, the OSI layers may exchange information and/or signals enabling configuring and/or adjustment of functions and/or modules in the layers. For example, the Physical Layer 302 may provide to the Data Link Layer 304 various information, shown as PHY_Ctrl_Info, which may in turn enable configuring and controlling the Physical Layer 302 (e.g., via PHY_Config) by the Data Link Layer 304 (and by higher layers operating via the Data Link Layer 304). The PHY_Ctrl_Info may comprise status information relating to the Physical Layer 302, and/or to various functions or modules thereof. The PHY_Ctrl_Info may also comprise information obtained via the Physical Layer 302.

Similarly, the Data Link Layer 304 may provide to the higher OSI layers 306 with various information, shown as DL_Ctrl_Info, which enable configuring and controlling the Data Link Layer 304 (e.g., via DL_Config) by the higher OSI layers 306. The DL_Ctrl_Info may comprise status information relating to the Data Link Layer 304 (and Physical Layer 302), and/or to various functions or modules thereof. The DL_Ctrl_Info may also comprise information obtained via the Data Link Layer 304. Dedicated configuration registers, such as configuration registers 312 of the Data Link Layer 304 may be utilized to store and maintain parameters used in effectuating requested configurations and/or adjustments.

In an exemplary aspect of the invention, the OSI module implemented by the device 200 may be configured and/or adjusted to enable and/or support power autoscaling operations. In this regard, implementing adaptive power autoscaling in the OSI model may comprise adding new, dedicated functions and/or modules, and/or modifying or adjusting existing functions and/or modules performing operations that may affect power consumption in the device 200 during communication. FIG. 3C describes in more details an exemplary implementation of power autoscaling into the OSI model.

Figure 3B:
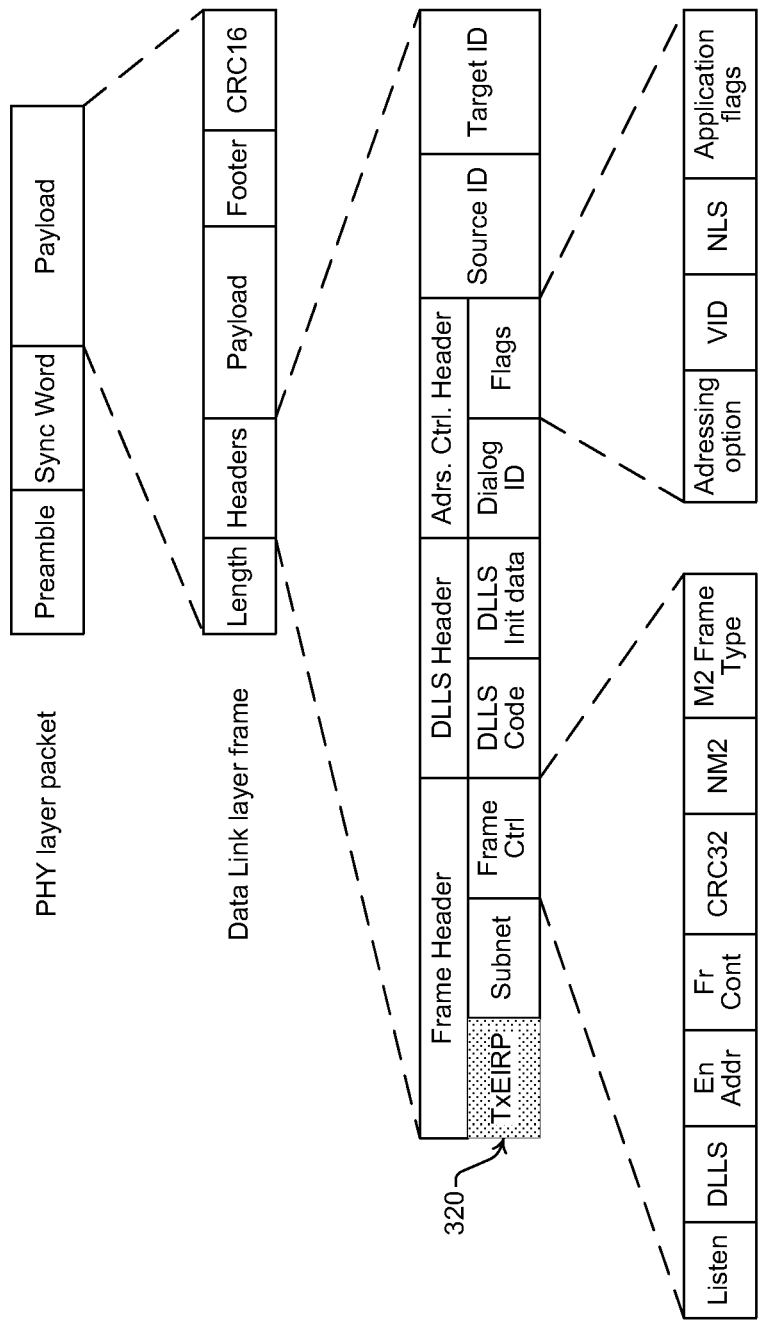
FIG. 3B is a block diagram illustrating exemplary structure of physical layer (PHY) packet carrying a data link layer frame, in accordance with an embodiment of the invention.
Figure 3C:
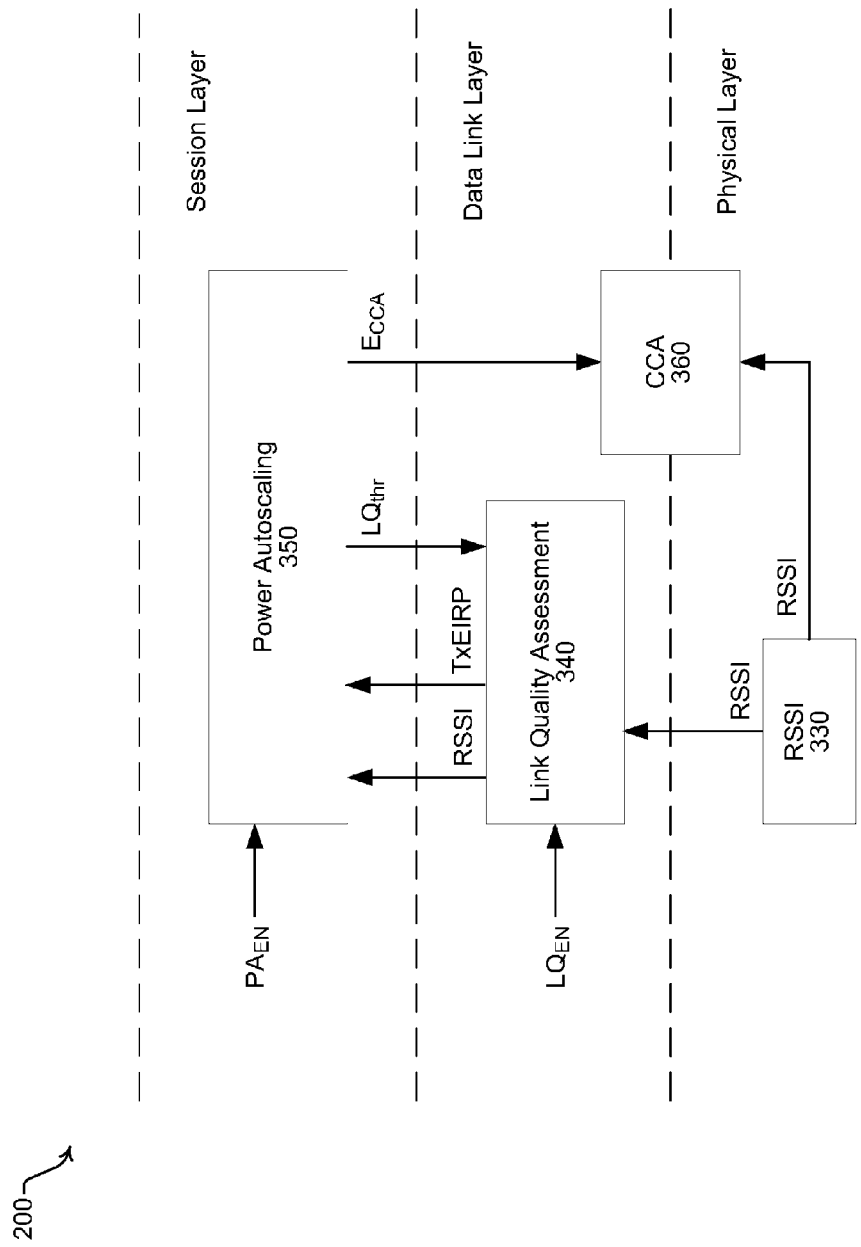
FIG. 3C is block diagram illustrating implementation of various aspects of the invention at different layers of the OSI model, in accordance with an embodiment of the invention

FIG. 3B is a block diagram illustrating exemplary structure of physical layer (PHY) packet carrying a data link layer frame, in accordance with an embodiment of the invention. Referring to FIG. 3B, there is shown an exemplary physical layer (PHY) packet carrying a data link layer frame, which may be structured in accordance with wireless protocols utilized by electronic devices that implement various aspects of the invention. Cross-referenced U.S. application Ser. No. 13/408,453 filed on Feb. 29, 2012 provides more details on the structures of exemplary PHY packets and/or data link layer frames.

The frame header may comprise a field (TxEIRP 320) indicating equivalent isotropic radiated power (EIRP) the transmitting device uses in transmitting the packet and frame. In other word, the TxEIRP field 320 embedded in the frame header provides the receiving device with information pertaining to the transmit power applied by the transmitting device. The TxEIRP field 320 may be utilized during power autoscaling operations, by enabling a receiving device to precisely determine the original transmit power for received signals being handled by the receiving device.

FIG. 3C is block diagram illustrating implementation of various aspect of the invention at different layers of the OSI model, in accordance with an embodiment of the invention. As shown in FIG. 3C, the device 200 may comprise various modules and/or processes that may be run in different layers of the OSI model, and may interact to facilitate performing various functions and/or operations of the device 200. For example, the device 200 may comprise a received signal strength indication (RSSI) module 330, which may operate at the Physical Layer (layer 1 of the OSI model); a link quality assessment module 340, which may operate at the Data Link Layer (layer 2 of the OSI model); and a power autoscaling module 350, which may operate at a higher layer, such as the Session Layer (layer 4 of the OSI model). The device 200 may also comprise a clear channel assessment (CCA) process 360, which may be implemented, accessible and/or executable by various modules and/or processes of one or more layers, such as the Physical Layer (layer 1 of the OSI model) and the Data Link Layer (layer 2 of the OSI model).

The RSSI module 330 may implement RSSI measurement operations, in which the strength of received signals may be determined, and reported as a value corresponding to particular relative level between the minimum and maximum values.

The link quality assessment module 340 may implement link quality assessment, during which certain checks are perform to determine whether a received frame (extracted from received packet) may be discarded, or processing of the frame is continued. In this regard, during link quality assessment, the TxEIRP field is extracted from the frame's header, and the value of detected RSSI for the frame is subtracted from the TxEIRP field to derive a corresponding link budget utilization value. If link quality filtering is enabled (e.g., by assertion of $LQ_{EN}$), the frame would be discarded and Data Link Layer processing of the received frame terminated when the derived link budget utilization value is greater than a particular link quality threshold (shown as $LQ_{thr}$).

The $LQ_{thr}$ may be configurable. Setting $LQ_{thr}$ to a relatively-high value may reduce power consumption because: the device may process fewer received packets (because they are dropped rather than being processed), the device may transmit fewer packets (because there are fewer successfully-received packets to respond to), and/or the average transmit power is lower (because responses are only being sent to devices which are reachable via a short/low-attenuation path). The value of $LQ_{thr}$ may be configured based, for example, on one or more of: location of the device (e.g., determined by GPS and/or other wireless signals), type of device (e.g., whether the device is a laptop, a smartphone, or a battery-powered tag), power source of the device (e.g., plugged-in or running on battery), remaining battery charge, which particular and/or types of the devices are desired to be communicated with, and results of past communications (e.g., number of responses received to previous requests).

The clear channel assessment (CCA) process 360 may be run to ensure that a particular channel that may be utilized during communication (transmission or reception) may be clear for use. This determination may be based on particular, predetermined conditions. For example, certain channel classes utilized during communication by the device 200 in accordance with supported protocol may require use of a carrier sense multiple access (CSMA) prior to transmission of data over a channel. In certain instances, upper layers of the OSI module, particularly the Data Link Layer and Transport Layer, may execute processes that utilize CSMA and Collision Avoidance models (CSMA-CA), which may incorporate CCA process 360 to ensure that a particular channel being evaluated is clear for use. The CCA process 360 may determine the status of particular channel based on measure RSSI, obtained from the RSSI module 330, and based on a particular energy threshold, $E_{CCA}$. In this regard, during CCA, the detected RSSI of the channel may be used to determine if it meets the following requirement in order for CCA to be declared successful: detected channel $RSSI \leq E_{CCA}$. The RSSI detection performed for CCA may have to meet particular precision criteria (e.g. be precise to within 6 dBm). The $E_{CCA}$ parameter may be provided by upper layers or configured as a default within the implementation of the Physical Layer.

The power autoscaling module 350 may be utilized to implement adaptive power autoscaling functionality and/or operations. In this regard, adaptive power autoscaling may comprise adaptively and/or dynamically adjusting power consumption associated with, and/or resulting from communication operations and/or processing in the device 200. Modifying power consumption and/or requirement may be, for example, performed by adjusting transmission power and minimum receive power thresholds. The power autoscaling module 350 may specify the transmit power levels, ramp-up/down steps, and/or idle intervals for use (e.g. via the Physical Layer) in controlling signal transmission. Exemplary receive power thresholds that may be set and/or adjusted via the power autoscaling module 350 may comprise the link quality threshold $LQ_{thr}$, which may be utilized in configuring and/or controlling link quality assessment; and the clear channel assessment energy threshold, $E_{CCA}$, which may be utilized in controlling clear control assessment. In other words, the power autoscaling module 350 may adjust reception related power by configuring and/or modifying reception related thresholds, such as $LQ_{thr}$ and $E_{CCA}$. Modifying at least some of the receive power thresholds may depend on measurements relating to reception of signals (e.g., RSSI) and/or parameters obtained from frames carried by the received signals (e.g., TxEIRP). Use of adaptive power autoscaling may be optional. In this regard, the power autoscaling module 350 may be activated (and thus perform power autoscaling) by assertion of a particular control signal/input, shown here as $AP_{EN}$. Applying changes to transmission and/or reception operations, necessitated by modifications to communication related parameters or threshold (e.g., $LQ_{thr}$ and $E_{CCA}$) may be achieved by means of control signals (e.g. Tx_Ctrl_Data and Rx_Ctrl_Data of FIG. 3B), which may be used in controlling and/or configuring physical components utilized in such transmission and/or reception.

Figure 4A:
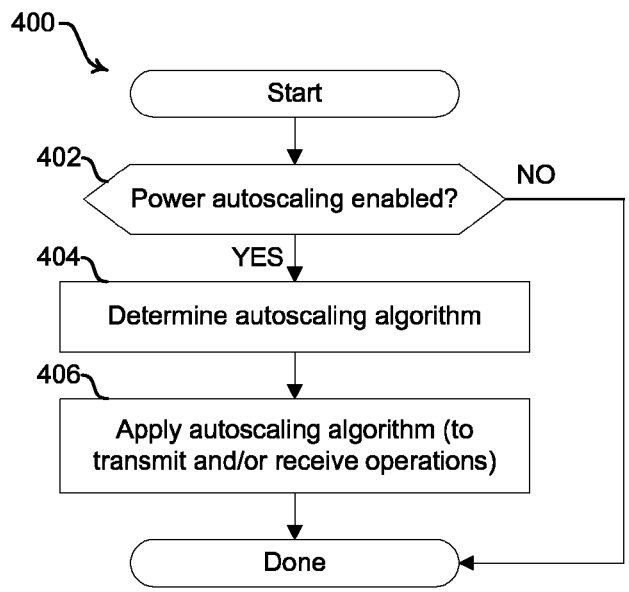
FIG. 4A is a flow chart that illustrates exemplary steps for supporting adaptive power autoscaling in an electronic device, in accordance with an embodiment of the invention.

FIG. 4A is a flow chart that illustrates exemplary steps for supporting adaptive power autoscaling in an electronic device, in accordance with an embodiment of the invention. Referring to FIG. 4A, there is shown a flow chart 400 comprising a plurality of exemplary steps that may be performed by an electronic device, such as device 200, to enable adaptive power autoscaling in a resource-constrained network during communications therein.

In step 402, a determination whether adaptive autoscaling is enabled may be performed. In this regard, adaptive autoscaling may be enabled (or disabled) by asserting (or de-asserting) a control signal or control parameters (e.g. in register), such as $PA_{EN}$, which may in turn activate corresponding function or module (e.g. power autoscaling module 350) for performing and/or managing power autoscaling operations. In instances where it may be determined that adaptive autoscaling is not enabled, the process may terminate.

Returning to step 402, in instances where it may be determined that adaptive autoscaling is enabled, the process may proceed to step 404. In step 404, the applicable power algorithm may be determined. In this regard, a plurality of algorithms for performing adaptive power autoscaling may be available for selection. The algorithms may comprise standard defined algorithms and/or proprietary algorithms. Each of the power autoscaling algorithms may define particular conditions for applying power scaling adjustments, and/or for each of such condition may define corresponding adjustments and/or configuration parameters that may cause modifications in power consumption, such as during transmit and/or receive operations. The electronic device 200 may maintain parameters for defining available algorithms. In this regard, each of available algorithms may be assigned a unique identifier, and a particular parameter may define which algorithm to select and/or particular condition for selecting each one of the available algorithm. This information may be maintained as part of a control database in the electronic device 200. Different algorithms may be selected based, for example, on one or more of: location of the device (e.g., determined by GPS and/or other wireless signals), type of device (e.g., whether the device is a laptop, a smartphone, or a battery-powered tag), power source of the device (e.g., plugged-in or running on battery), remaining charge in a battery of the device, which particular and/or types of the devices are desired to be communicated with, and results of past communications (e.g., number of responses received to previous requests). In step 406, the selected algorithm may be applied.

Figure 4B:
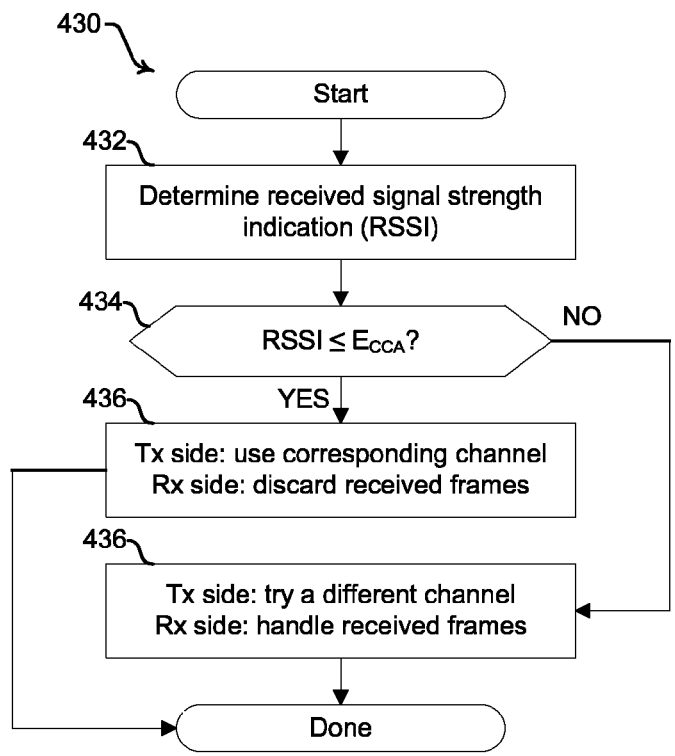
FIG. 4B is a flow chart that illustrates exemplary steps for performing clear channel assessment using thresholds configured based on adaptive autoscaling to adjust reception sensitivity, in accordance with an embodiment of the invention.

FIG. 4B is a flow chart that illustrates exemplary steps for performing clear channel assessment using thresholds configured based on adaptive autoscaling to adjust reception sensitivity, in accordance with an embodiment of the invention. Referring to FIG. 4B, there is shown a flow chart 430 comprising a plurality of exemplary steps for performing clear channel assessment, which may be performed in an electronic device, such as device 200.

In step 432, the received signal strength indication (RSSI) may be determined. In step 434, a determination whether the RSSI is less than or equal to the clear channel energy threshold ($E_{CCA}$) may be performed. In this regard, the $E_{CCA}$ threshold may be utilized to control transmission and/or reception with respect to particular channel based on specific energy level associated with that particular channel. In instances where it may be determined that the RSSI is less than or equal to $E_{CCA}$, the process may proceed to step 436. In step 436, transmission and/or reception operations may be configured in accordance with the condition that $RSSI \leq E_{CCA}$. Particularly, on the transmit (Tx) side, under such condition the corresponding channel may be utilized for transmitting signals. The use of the channel may be done after a brief wait and a recheck of the condition (i.e., step 434). On the reception (Rx) side, under such condition packet/frames carried via received signals may be dropped. In other words, when the RSSI is less than or equal to $E_{CCA}$, the signal is perceived as being too low to be reliable, and packets/frames carried via such signal are discarded.

Returning to step 434, in instances where it may be determined that the RSSI is greater than $E_{CCA}$, the process may proceed to step 438. In step 438, transmission and/or reception operations may be configured in accordance with the condition that $RSSI > E_{CCA}$. Particularly, on the transmit (Tx) side, under such condition, the corresponding channel may be deemed as not clear, and as such is unsuited for transmitting signals. On the reception (Rx) side, under such condition, handling and/or processing of packet/frames carried via received signals may proceed. In other words, when the RSSI is greater than $E_{CCA}$, the signal is perceived to be sufficiently reliable, and packets/frames carried via such signal may be processed.

In an embodiment of the invention, the value of the $E_{CCA}$ threshold may be adjusted in accordance with applicable power autoscaling operations. In this regard, adjusting the $E_{CCA}$ threshold may modify reception sensitivity—that is setting the $E_{CCA}$ threshold lower would enable handling 'weak' signals whereas setting the $E_{CCA}$ threshold to higher value would cause the electronic device to ignore stronger signals. The $E_{CCA}$ threshold may also be adjusted to modify transmission sensitivity—that is setting the $E_{CCA}$ threshold lower may cause the electronic device to determine that a channel is unsuited for transmission whereas setting the $E_{CCA}$ threshold to higher value would allow the electronic device to use that channel. Because $E_{CCA}$ threshold affects both signal reception and transmission, different thresholds for transmission and reception (e.g., $Tx\_E_{CCA}$ and $Rx\_E_{CCA}$) may be used to ensure that a particular effect on one side (e.g. reception) would not cause an unintended effect on the other side (e.g. transmission).

Figure 4C:
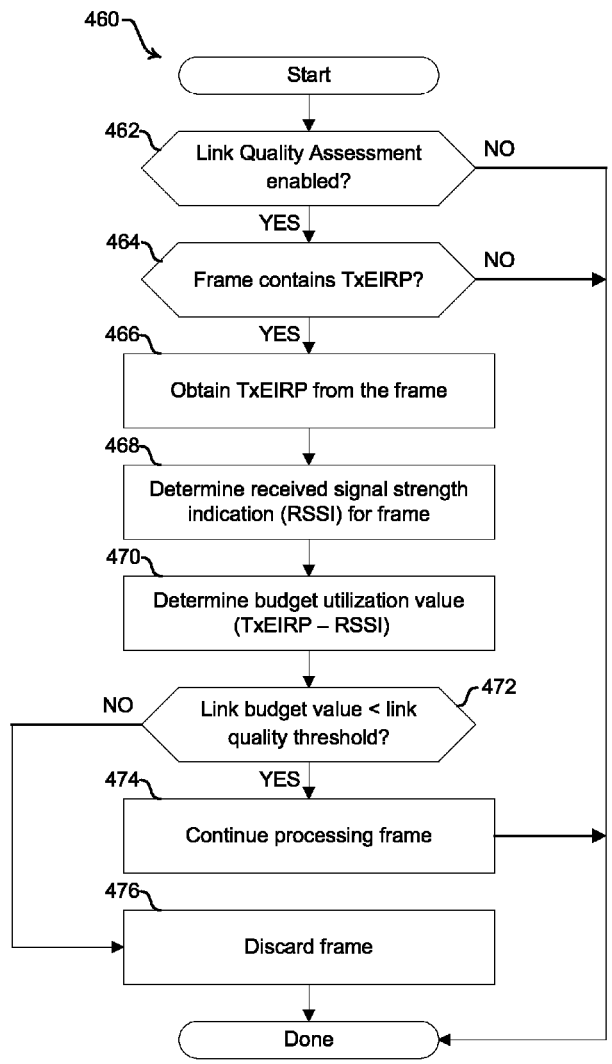
FIG. 4C is a flow chart that illustrates exemplary steps for performing link quality assessment using thresholds configured based on adaptive autoscaling to adjust reception sensitivity, in accordance with an embodiment of the invention.

FIG. 4C is a flow chart that illustrates exemplary steps for performing link quality assessment using thresholds configured based on adaptive autoscaling to adjust reception sensitivity, in accordance with an embodiment of the invention. Referring to FIG. 4C, there is shown a flow chart 460 comprising a plurality of exemplary steps for performing link quality assessment, which may be performed in an electronic device, such as device 200.

In step 462, a determination whether link quality assessment is enabled may be performed. In this regard, link quality assessment may be enabled (or disabled) by asserting (or de-asserting) a control signal or control parameters (e.g. in register), such as $LQ_{EN}$, which may in turn activate corresponding function or module (e.g. link quality assessment module 340) for performing and/or managing power autoscaling operations. In instances where it may be determined that link quality assessment is not enabled the process may terminate.

Returning to step 462, in instances where it may be determined that link quality assessment is enabled the process may proceed to step 464. In step 464, a determination whether a received (data link) frame comprises a TxEIRP field may be performed. In this regard, the TxEIRP field may indicate the equivalent isotropic radiated power (EIRP)—i.e., power— that the transmitting device originally utilized in transmitting the packet (or frame) which is being handled by the receiving device. In instances where it may be determined that the received frame does not comprise the TxEIRP field the process may terminate.

Returning to step 464, in instances where it may be determined that the received frame comprises the TxEIRP field the process may proceed to step 466. In step 466, the TxEIRP field (or value thereof) may be extracted. In step 468, the received signal strength indication (RSSI) may be determined. In this regard, the RSSI may measure the strength of the signal(s) carrying the packet that comprise the frame in question, as determined by the receiving device. In step 470, the link budget utilization value may be determined, by subtracting the measured RSSI value from the extracted TxEIRP. In other words, the link budget utilization value may correspond to the loss of power during communication of the signals carrying the packet (frame) between the transmitting device and the receiving device. In step 472, it may be determined whether the calculated link budget utilization value is less than a particular link quality threshold. In this regard, the link quality threshold $LQ_{thr}$ may be configurable value. Specifically, the $LQ_{thr}$ parameter may be set and/or adjusted during adaptive power autoscaling, to enable modifying signal reception sensitivity in the device 200. The value of the $LQ_{thr}$ threshold, and/or any adjustment thereof, may be dictated by the applicable power autoscaling algorithm. In instances where it may be determined that the link budget utilization value is less than the link quality threshold ($LQ_{thr}$), the process may proceed to step 474, enabling handling and/or processing of the frame to continue. Returning to 472, in instances where it may be determined that the link budget utilization value is not less than the link quality threshold ($LQ_{thr}$), the process may proceed to step 476, where handling and/or processing of the frame may be stopped and the frame may be discard.

Adjusting the $LQ_{thr}$ threshold may modify reception sensitivity. In this regard, when the $LQ_{thr}$ threshold is set to a low value, received signals communicated over links having high link budget value (i.e. large power loss) may be perceived (the signal) as being sufficiently unreliable, and packets/frames carried via such signal may be discarded; whereas when the $LQ_{thr}$ threshold is set to a high value, received signals communicated over links having low link budget value (i.e. small power loss) may perceived as being sufficiently reliable, and packets/frames carried via such signals are processed. In an embodiment of the invention, the value of the $LQ_{thr}$ threshold may be adjusted in accordance with applicable power autoscaling operations. In this regard, adjusting the $LQ_{thr}$ threshold may enable modifying reception sensitivity—that is setting the $LQ_{thr}$ threshold to a high value would enable handling and/or processing packets/framed carried via signal communicated over a link having a particular link budget value (power loss) whereas packets/frames, carried via similar signals communicated over link with similar link budget value would be discarded when the $LQ_{thr}$ threshold is decreased.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for power autoscaling in a resource-constrained network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   performing in an electronic device:
      determining a difference between a received signal strength of a received frame and a power at which said received frame was transmitted, wherein said power at which said received frame was transmitted is embedded in a transmitted power field of said received frame;
      comparing said difference to a threshold;
      discarding said received frame during data link layer processing when said difference is greater than said threshold; and
      adaptively adjusting said threshold based on a number of responses received to previous communications sent by said electronic device.

2. The method of claim 1, wherein said transmitted power field is formatted as an equivalent isotropic radiated power (EIRP) value.

3. The method of claim 1, comprising adaptively adjusting said threshold based on a location of said electronic device.

4. The method of claim 1, comprising adaptively adjusting said threshold in accordance with a particular algorithm selected from a plurality of available algorithms, said plurality of available algorithms comprise standard based algorithms and/or proprietary algorithms.

5. A system, comprising:
   an electronic device operable to:
      determine a difference between a received signal strength of a received frame and a power at which said received frame was transmitted, wherein said power at which said received frame was transmitted is embedded in a transmitted power field of said received frame;
      compare said difference to a threshold;
      discard said received frame during data link layer processing when said difference is greater than said threshold; and adaptively adjust said threshold based on a number of responses received to previous communications sent by said electronic device.

6. The system of claim 5, wherein said transmitted power field is formatted as an equivalent isotropic radiated power (EIRP) value.

7. The system of claim 5, wherein said electronic device is operable to adjust said threshold based on determination of a desired maximum communication range and/or a particular target peer device.

8. The system of claim 5, wherein said electronic device is operable to adjust said threshold based on a location of said electronic device.

9. The system of claim 5, wherein said electronic device is operable to selectively activate or deactivate adaptive power management.

10. The system of claim 5, wherein said electronic device is operable to adaptively adjust said threshold in accordance with a particular algorithm selected from a plurality of available algorithms, said plurality of available algorithms comprise standard based algorithms and/or proprietary algorithms.

* * * * *